United States Patent [19]
Lehmann et al.

[11] 3,947,353
[45] Mar. 30, 1976

[54] WATER PURIFICATION PROCESS

[75] Inventors: Joachim Walter Lehmann, Kelkheim, Taunus; Armand Lehinant, Offenbach, Main, both of Germany

[73] Assignee: Hoechst Aktiengesellschaft, Frankfurt am Main, Germany

[22] Filed: Apr. 3, 1974

[21] Appl. No.: 457,715

[30] Foreign Application Priority Data
Apr. 5, 1973   Germany............................ 2316972

[52] U.S. Cl..................................... 210/52; 210/54
[51] Int. Cl.²............................................ C02B 1/20
[58] Field of Search......................... 210/42, 51–54, 210/58, 59

[56] References Cited
UNITED STATES PATENTS

| | | | |
|---|---|---|---|
| 2,234,285 | 3/1941 | Schworm et al. | 210/53 |
| 2,264,103 | 11/1941 | Tucker | 210/58 |
| 2,315,734 | 4/1943 | Ralston et al. | 210/54 |
| 2,862,880 | 12/1958 | Clemens | 210/54 |
| 3,487,928 | 1/1970 | Canevari | 210/51 |
| 3,728,419 | 4/1973 | Stanford et al. | 210/58 |

*Primary Examiner*—Thomas G. Wyse
*Assistant Examiner*—Peter A. Hruskoci
*Attorney, Agent, or Firm*—Curtis, Morris & Safford

[57] ABSTRACT

Waste waters containing water glass, for example resulting from the dyeing of fabrics are purified by adding small amounts of basic nitrogen compounds, e.g. amines to the waste water and then carrying out the known flocculation process.

8 Claims, No Drawings

WATER PURIFICATION PROCESS

The present invention relates to a water purification process.

Waste waters which contain suspended matter, anionic or amphoteric colloids or certain anions are generally purified according to known processes by adding solutions of salts of trivalent metals, preferably of iron and aluminium, at pH values of scarcely above the neutral point. By hydrolysis or by reaction with the ions causing the temporary hardness of the water, also by a simultaneous pH correction (final pH 7.5 to 8) the metal hydroxides precipitate as strongly hydrous gel flakes. Suspended matter, colloids and large molecule anions are precipitated with them, by occlusion as well as by adsorption. The precipitated gel agglomerates age quickly, settle and can be separated from the purified water.

The use of sodium water glass in the textile industry as especially active alkali and as stabilizer has increased greatly recently. If water glass gets into the waste water in greater quantities (from 0.1 g/l) the above purification process of the waste water by flocculation of metal hydroxides is disturbed considerably: with the presence of water glass precipitation of iron (III)-hydroxide and also of aluminium hydroxide, even in the alkaline range, is hindered completely or partly. The purifying effect of the hydroxide precipitation therefore fails.

Sodium water glass, as non-crystallizable technical product, does not have a chemical constitution which can be given exactly. However, if the proportion of the starting products, calcinated soda to quartz said in the ratio of 1 : 2, used in the industrial preparation, is taken as a basis, a composition is obtained which corresponds approximately to the idealized formula $Na_2O.4\ SiO_2$ with a formula weight of 302.

Sodium water glass can be taken, therefore, as sodium tetrapolysilicate. It differs considerably from sodium metasilicate $Na_2SiO_3$ in its chemical and colloidal behaviour.

The polysilicate anion behaves obviously in a way similar to a stabilizing protective colloid and prevents the flocculation of the metal hydroxides also in the alkaline field.

It is not possible to obtain a precipitation of silicic acid from water glass solutions by acidification alone. With small water glass concentrations no precipitation takes place at all in the cold; with higher concentrations, even a homogeneous gelling of the total volume of the liquid takes place after the acidification without any tendency to the formation of a separable phase.

A process has now been found for the purification of waste waters containing water glass according to the flocculation process with hydroxides of trivalent metals, such as, for example, iron or aluminium, wherein basic organic nitrogen compounds or the salts thereof with mineral or organic acids are added to the water containing water glass and the flocculation reaction is carried out under the usual conditions. This addition preferably in equivalent quantities allows the flocculation by metal hydroxides to become effective again. The nitrogen bases can be added before mixing with the metal salts as well as afterwards. The precipitation should be carried out at approximately pH 7 to 8.5. It is, therefore, recommended that the waste water to be purified be neutralized if necessary, for example, by milk of lime or sulphuric acid. The flocculation is concluded after the usual period of time.

One liter of a commercial sodium water glass of 49° Be, $d = 1.52$ g/ml, used frequently in dye works, contains 46 percent by weight, i.e. 0.7 kg, of sodium tetrapolysilicate of formula weight 302, corresponding to 2.3 moles. For each mole of sodium tetrapolysilicate 1 mole of an amine or one-half mole of a diamine is to be used. For 1 liter of the water glass named, therefore, for example, 0.35 kg of triethanol amine (molecular weight 149.2) or 0.07 kg of ethylene diamine (molecular weight 60) is required. It follows that for the elimination of the water glass only small quantities of the nitrogen bases are necessary.

Also less than 1 mole of amine per formula weight of $Na_2Si_4O_9$ (= 302 g) can be used; thereby, however, the quantity of the flocculated precipitate is reduced. Quantities greater than 1 mole of amine do not generally increase the precipitate. The concentration of the sodium tetrapolysilicate in the waste water results from the quantity of water glass used and the degree of the dilution by the rinsing water and other waste waters free from water glass. In the case of an unknown content of water glass a silicate analysis can be carried out in the water to be treated. Alternatively, after the addition of iron (III)-chloride or aluminium sulfate the amine can be slowly added until a further addition no longer increases the precipitation.

As nitrogen bases for the purpose planned are especially suitable primary, secondary and tertiary mono- and diamines which may be aliphatic or aromatic, preferably amines with a low molecular weight are used, since the equivalent proportion to water glass is then reached with low additions and, therefore, an economical working is possible. Especially suitable are amines, the alkyl groups of which consist of from 1 to 6, preferably from 1 to 4, carbon atoms and which can be substituted by hydroxyl groups, or alkylene diamines, both amino groups of which are linked by a chain of from 1 to 6, preferably from 2 to 4 carbon atoms. The following compounds may be used, for example, acylic amines such as methyl amine, dimethyl amine, trimethyl amine, ethyl amine, triethyl amine; alkanol amines such as mono-, di- or triethanol amine; alkyl-dialkanol amines such as methyl diethanol amine; dialkylalkanol amines such as dimethyl ethanol amine, diamines such as ethylene diamine or propylene diamine, and aromatic amines such as aniline. Also cyclic secondary amines such as piperidine, piperazine, imidazolidine, pyrroline, pyrrolidine, ethylene imine or 2-methyl-aziridine, or tertiary amines such as N-methyl-pyrrolidine can be used. Bases with low boiling point (for example methyl amine) can be added in gaseous form, in solution or in solid form (for example, in the form of their hydrochlorides). As organic nitrogen bases, furthermore, cyclic unsaturated nitrogen bases such as pyridine or its homologous or quaternary ammonium bases may be used. Bases with as low as possible bactericide effect are advantageous, in case the separated sewage sludge should be rotted.

According to this process waste waters which contain water glass in concentrations of over 0.1 g/l, especially waste waters from dye works can be freed from suspended matter, colloids and water glass. Smaller quantities of water glass do not influence substantially purification by flocculation.

The following examples illustrate the invention.

EXAMPLE 1

A fabric was padded on a pad with a liquor pick-up of 50 % with a dye liquor which contained 200 ml of water glass of 49° Be in the liter. The goods thus contained 100 ml of the dye-liquor containing water glass per kg. When the time of action was over the goods were rinsed with a ten-fold quantity of cold water whereby the water glass came into the waste water.

The waste water contained, therefore, 10 ml/l of the original water glass of 49°Be, which corresponded to a technically possible maximum concentration of water glass in the waste water.

3.5 g/l of triethanol amine were added to the alkaline waste water and the pH was adjusted to 8.0 to 8.5 with diluted sulfuric acid. In order to undertake the flocculation in the usual manner with iron (III)-chloride an aqueous solution of 2.5 g/l $FeCl_3 \cdot 6H_2O$ was added, whereby the pH was decreased to approximately 7.5. The precipitation started immediately. In practice the quantity of iron salts or other metal salts used depends on the desired purification effect and on the impurities present. By this treatment the waste water was freed from the main quantity of water glass as well as from other substances to be eliminated (suspended matter, dyestuffs).

EXAMPLE 2

The process was carried out as above but without the addition of triethanol amine. No precipitate separated even after standing for a longer time.

EXAMPLE 3

In the place of triethanol amine 0.7 g/l of ethylene diamine was added to a waste water with the same composition as in example 1. Otherwise the process was carried out as in example 1 and an equally good purification result was obtained.

EXAMPLES 4 to 7

In the place of triethanol amine
1.6 g/l of pyrrolidine,
or 2.0 g/l of piperidine,
or 1.0 g/l of piperazine,
or 1.0 g/l of ethylene imine
were added to a waste water with the same composition as in Example 1. Otherwise the process was carried out as in exmaple 1 and in all 4 cases an equally good purification result was obtained. An analysis of the purified water gave a content of less than 10 mg/1 of total silicate.

What is claimed is:

1. In a process for the purification of textile waste water by adding thereto an aluminum salt or iron salt as an inorganic flocculant to remove suspended and colloidal matter and anions having large molecules by flocculation, the improvement, when said textile waste water additionally contains therein at least 0.1 gram per liter of dissolved sodium silicate of the approximate formula $Na_2O \cdot 4SiO_2$, the presence of which interferes with said flocculation, which comprises maintaining a pH of 7 to 8.5 and additionally adding to said waste water a member selected from the group consisting of about 1 mol of a monoamine, or of an acid salt thereof, and about one-half mol of a diamine, or of an acid salt thereof, per mol of $Na_2O \cdot 4SiO_2$, said monoamine having 1–6 carbon atoms and said diamine being an alkylene diamine having 1–6 carbon atoms.

2. A process as in claim 1 wherein said monoamine having 1–6 carbon atoms is a member selected from the group consisting of mono-, di-, or tri-alkylamines and such amines in which at least one alkyl group is replaced by alkylol.

3. The process as defined in claim 1, wherein said basic nitrogen compound is a monoamine.

4. The process as defined in claim 1, wherein said monoamine is triethanol monoamine.

5. The process as defined in claim 1, wherein said monoamine is a compound selected from the group consisting of dialkylalkanol monoamines and alkyldialkanol monoamines.

6. The process as defined in claim 1, wherein said basic nitrogen compound is an alkylene diamine in which both amino groups are linked by a chain of from 1 to 6 carbons.

7. The process as defined in claim 6, wherein said alkylene diamine is ethylene diamine.

8. The process as defined in claim 6, wherein said alkylene diamine is propylene diamine.

* * * * *